US012646989B2

(12) United States Patent
Kuehbacher et al.

(10) Patent No.: US 12,646,989 B2
(45) Date of Patent: Jun. 2, 2026

(54) STATOR OF AN ELECTRIC MACHINE WITH COOLING IN SLOT

(71) Applicant: Robert Bosch GmbH, Stuttgart (DE)

(72) Inventors: Daniel Kuehbacher, Stuttgart (DE); Felix Bensing, Stuttgart (DE); Patrick Fruehauf, Besigheim (DE)

(73) Assignee: Robert Bosch GmbH, Stuttgart (DE)

( * ) Notice: Subject to any disclaimer, the term of this patent is extended or adjusted under 35 U.S.C. 154(b) by 86 days.

(21) Appl. No.: 18/291,025

(22) PCT Filed: Jun. 8, 2022

(86) PCT No.: PCT/EP2022/065455
§ 371 (c)(1),
(2) Date: Jan. 22, 2024

(87) PCT Pub. No.: WO2023/001446
PCT Pub. Date: Jan. 26, 2023

(65) Prior Publication Data
US 2024/0258858 A1 Aug. 1, 2024

(30) Foreign Application Priority Data
Jul. 23, 2021 (DE) ..................... 10 2021 207 921.0

(51) Int. Cl.
*H02K 3/24* (2006.01)
*H02K 3/50* (2006.01)
*H02K 9/19* (2006.01)

(52) U.S. Cl.
CPC ................. *H02K 3/24* (2013.01); *H02K 3/50* (2013.01); *H02K 9/19* (2013.01)

(58) Field of Classification Search
CPC ............. H02K 3/24; H02K 3/34; H02K 3/345
See application file for complete search history.

(56) References Cited

U.S. PATENT DOCUMENTS 3,119,033 A * 1/1964 Horsley ................... H02K 3/24
310/214
4,994,700 A * 2/1991 Bansal ..................... H02K 3/48
310/60 A
(Continued)

FOREIGN PATENT DOCUMENTS

CN 102420468 B 11/2017
DE 102019113785 A1 11/2020
(Continued)

OTHER PUBLICATIONS

Kowalski (EP 2693608 A1) English Translation. (Year: 2014).*
(Continued)

*Primary Examiner* — Tulsidas C Patel
*Assistant Examiner* — Robert E Mates
(74) *Attorney, Agent, or Firm* — Michael Best & Friedrich LLP

(57) ABSTRACT

A stator of an electric machine includes a laminated core on which stator teeth and stator grooves are formed. A conductor bundle is arranged in each stator groove. A groove base channel extends in the axial direction and through which a coolant can flow. The groove base channel is formed between the groove base of the respective stator groove and the conductor bundle. A groove slot channel extends in the axial direction and is formed in the groove slot. The groove slot channel is fluidically connected to the groove base channel at at least one distributor point via a distributor connection that runs in the radial direction. The cooling path of the stator groove is formed such that a cooling flow is forced from the groove slot channel into the groove base channel and/or vice versa via the at least one distributor connection.

16 Claims, 4 Drawing Sheets

(56) References Cited

U.S. PATENT DOCUMENTS

| | | | |
|---|---|---|---|
| 2011/0133580 A1* | 6/2011 | Sugimoto | H02K 1/20 |
| | | | 310/54 |
| 2012/0074708 A1 | 3/2012 | Le Besnerais | |
| 2018/0351434 A1 | 12/2018 | Knoblauch et al. | |
| 2019/0363601 A1 | 11/2019 | Kneidl et al. | |
| 2020/0156296 A1 | 5/2020 | E Silva et al. | |
| 2020/0373803 A1* | 11/2020 | Stoll | H02K 3/28 |
| 2022/0014062 A1 | 1/2022 | Almeida E Silva et al. | |
| 2022/0311297 A1 | 9/2022 | Hinrich et al. | |
| 2023/0013487 A1 | 1/2023 | Grimm et al. | |
| 2024/0213839 A1 | 6/2024 | Vogt et al. | |
| 2024/0258857 A1 | 8/2024 | Kuehbacher et al. | |
| 2025/0088048 A1 | 3/2025 | Kronsteiner et al. | |
| 2025/0167603 A1 | 5/2025 | Kuehbacher et al. | |

FOREIGN PATENT DOCUMENTS

| | | | | |
|---|---|---|---|---|
| EP | 2693608 A1 * | 2/2014 | | H02K 3/24 |
| FR | 3093388 A1 | 9/2020 | | |
| JP | S52124039 U | 9/1977 | | |
| JP | S5449520 U | 4/1979 | | |
| JP | S55133640 A | 10/1980 | | |
| JP | S58127833 U | 8/1983 | | |
| JP | 2001145302 A | 5/2001 | | |
| JP | 2012100433 A | 5/2012 | | |
| JP | 2014197962 A | 10/2014 | | |
| JP | 2015033226 A | 2/2015 | | |
| JP | 2018164374 A | 10/2018 | | |
| JP | 2020089261 A | 6/2020 | | |
| JP | 2020524469 A | 8/2020 | | |

OTHER PUBLICATIONS

Translation of International Search Report for Application No. PCT/EP2022/065455 dated Oct. 14, 2022 (2 pages).
Non-final Office Action issued by the U.S. Patent Office for U.S. Appl. No. 18/291,007 dated Sep. 30, 2025 (16 pages).
Notice of Allowance issued by the U.S. Patent Office for U.S. Appl. No. 18/291,019 dated Oct. 20, 2025 (9 pages).
Final Office Action issued by the U.S. Patent Office for U.S. Appl. No. 18/291,007 dated Jan. 22, 2026 (18 pages).

* cited by examiner

STATOR OF AN ELECTRIC MACHINE WITH COOLING IN SLOT

BACKGROUND

The invention is based on a stator of an electric machine.

A stator of an electric machine is already known from DE102019113785 A1, having a stator axis and a laminated core on which stator teeth and stator grooves located between the stator teeth are formed and which comprises a plurality of sheet metal laminates, the stator teeth being connected together via an annular stator yoke, a conductor bundle comprising a plurality of conductors being provided in each of the stator grooves for forming an electric stator winding, the stator grooves each having a groove base facing the stator yoke and a groove slot facing away from the groove base, which is in particular formed between two tooth heads of the respective stator teeth, in each case a plurality of supporting points distanced from one another in the axial direction with respect to the stator axis being formed in the stator grooves in order to support the conductor bundle lying the respective stator groove and, between the groove base of the respective stator groove and the conductor bundle arranged in the stator groove a groove base channel is formed, which extends in the axial direction and through which a coolant, in particular oil, can flow along a cooling path between a groove inlet and a groove outlet of the respective stator groove, and which extends in the radial direction into the region of the tooth flanks of the respective stator groove. Furthermore, tooth flank channels are formed between the tooth flanks of the respective stator groove and the conductor bundle arranged in the stator groove, through which the coolant can flow along the cooling path.

Flow passes through the groove base channel and the tooth flank channels of the respective stator slot in the axial direction, with the coolant in the respective stator groove increasingly heating up in the direction of flow. It is difficult to ensure uniform flow through the respective stator groove in the area of the groove base channel and the two tooth flank channels, for example in view of manufacturing tolerances. Doing so can result in a lower cooling effect on the conductors of the conductor bundle around which the flow is weaker in each case. Thus, an uneven cooling effect can occur in the respective stator groove as seen in the radial direction, since, for example, the radially inner and most strongly heating conductors of the conductor bundle are cooled the least (as a result of the smallest temperature difference between the corresponding conductor and the coolant and/or as a result of the weaker flow around it). Uneven cooling of the conductor bundle in the respective stator groove can adversely affect the performance and service life of the electric machine.

SUMMARY

In contrast, the stator of the electric machine according to the invention has the advantage that the conductor bundle of the respective stator groove is cooled more uniformly, as seen in the radial direction, by all conductors of the conductor bundle being cooled essentially equally well, i.e., with equally strong flow around them.

According to the invention, this is achieved by forming, in the groove slot of the respective stator groove, a groove slot channel extending in the axial direction, which is fluidically connected to the groove base channel of the same stator groove at at least one distributor point via a distributor connection running in the radial direction with respect to the stator axis, and by the cooling path of the stator groove being designed in such a way that a cooling flow is forced from the groove slot channel via the at least one distributor connection into the groove base channel and/or vice versa.

The distributor connection generates a radial cooling flow in each stator groove, which produces a similar or equally effective cooling effect on all conductors of the conductor bundle.

According to a first exemplary embodiment, the groove inlet of the respective stator groove is provided at one end of the groove slot channel (and in particular only in that location) and the groove outlet of the same stator groove is provided at an end of the groove base channel facing away from the groove inlet (and in particular only in that location). In this way, the radial position of the groove inlet and the groove outlet forces a cooling flow in the stator groove from the groove inlet via the at least one distributor connection into the groove base channel and from there towards the groove outlet. The cooling flow is thus selected such that the coolant flows radially inwards into the stator groove and radially outwards out of the stator groove, so that the radially inner conductors have colder coolant flowing around them than the radially outer conductors, which leads to a further improvement or equalization of the cooling effect. Alternatively, the groove inlet of the respective stator groove can be arranged at one end of the groove base channel and the groove outlet of the same stator groove can be arranged at an end of the groove slot channel facing away from the groove inlet.

According to an alternative embodiment, the groove inlet and the groove outlet of the same stator groove are both provided either at opposite ends of the groove slot channel or at opposite ends of the groove base channel, a closure or throttling element being provided in the groove slot channel or in the groove base channel for closing or throttling a short-circuit path bypassing the distributor connection(s). In this way, a meandering cooling path is created in the stator groove, which comprises at least two distributor connections, through which flow takes place in opposite directions as seen in the radial direction.

The distributor connection can advantageously lead through and/or around the conductor bundle in each case.

The distributor connection can advantageously be formed in each case by at least one channel-shaped or groove-shaped indentation on the conductor bundle or by at least one through channel through the conductor bundle or by at least one enlarged groove gap between walls of the stator groove and the conductor bundle.

It is particularly advantageous if a plurality of distributor connections distanced in the axial direction is provided in the respective stator groove. In this way, uniform radial cooling of the conductor bundle along the axial direction is better equalized.

It is also advantageous that the groove slot channel of the respective stator groove is sealed radially inwards with a groove closure. In this way, flow through the groove slot channel is possible in the axial direction, in particular entirely. The groove closure can be a closure element arranged in the stator groove or a closure sleeve, such as a gap tube, which rests radially on the inside against the stator teeth of the stator. The closure sleeve would close all stator grooves of the stator.

It is very advantageous if the groove base channel of the respective stator groove is formed by a groove-shaped recess in the groove base of the stator groove. As a result, it is easy to form a groove slot channel with a sufficiently large flow cross-section in the groove base.

It is also advantageous if the support points are formed by twisting at least two support discs, in particular sheet metal laminates, of the laminated core by a certain angle of twist about the stator axis or by retaining elements formed in the respective stator groove. In this way, the conductor bundle of the respective stator groove is held, for example retained, between two tooth flanks at the respective support point. Alternatively, the support points can be formed by retaining elements of the respective support device, which are, e.g., designed as separate or integral elements.

The invention further relates to an electric machine having a housing in which a stator according to the invention is arranged, the stator winding forming a winding head on each end face of the stator, a winding head cooling chamber accommodating the respective winding head being provided inside the housing on each end face of the stator for cooling the respective winding head, flow through the stator grooves being possible, starting from one of the two winding head cooling chambers, via the cooling path of the stator grooves according to the invention into the other winding head cooling chamber. Particularly effective cooling of the stator can be achieved in this way.

BRIEF DESCRIPTION OF THE DRAWINGS

An exemplary embodiment of the invention is illustrated in simplified form in the drawings and explained in further detail in the description hereinafter.

DETAILED DESCRIPTION

Figure 1:
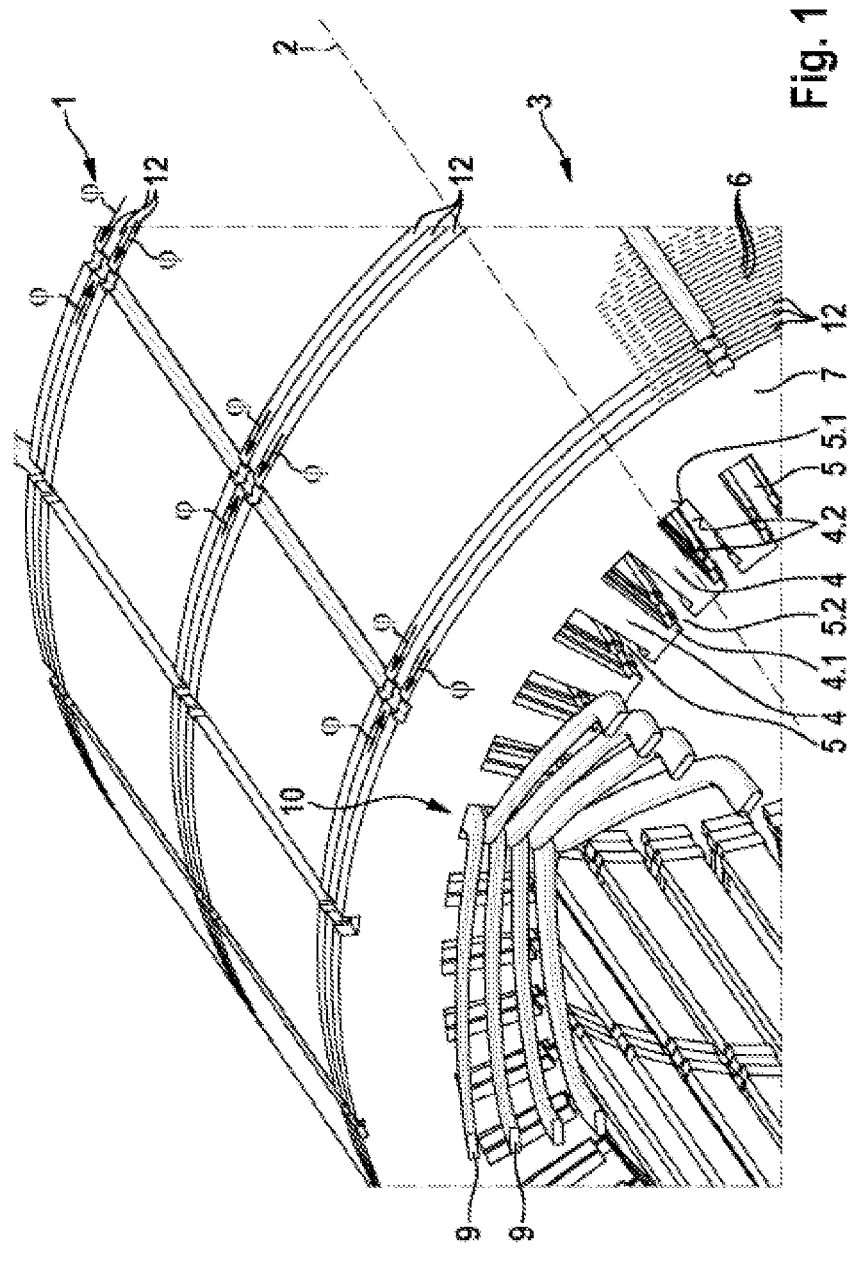
FIG. 1 shows a partial view of a stator of an electric machine according to the invention, FIG. 2 a sectional view of the stator according to FIG. 1 with a conductor bundle mounted in one of the stator grooves at a plurality of support points according to the invention, FIG. 3 a sectional view of the stator for a section along line III-III in FIG. 2, and FIG. 4 a partial view of an electric machine in longitudinal section with the stator according to the invention in FIG. 1 to FIG. 3.

FIG. 1 shows a partial view of a stator of an electric machine according to the invention.

The stator 1 of an electric machine has a stator axis 2 and comprises a laminated core 3 on which stator teeth 4 are formed, with stator grooves 5 lying between the stator teeth 4, which laminated core is formed by a stack of sheet metal laminates 6.

The stator teeth 4 are connected together via an annular stator yoke 7 of the laminated core 3 and can have a tooth head 4.1. A conductor bundle 10 comprising a plurality of conductors 9 is provided in each of the stator grooves 5 in order to form an electric stator winding 8. To illustrate the invention, FIG. 1 shows a conductor bundle 10 in only one of the stator grooves 5.

The conductors 9 of the stator 1 can each be designed as a flat wire conductor, each of which has a square, in particular rectangular, conductor cross-section. Furthermore, the conductors 9 of the stator 1 can each be formed as hairpin or as I-pin conductor elements. The conductors 9 are, e.g., coated with an insulating varnish in a known manner.

Figure 2:
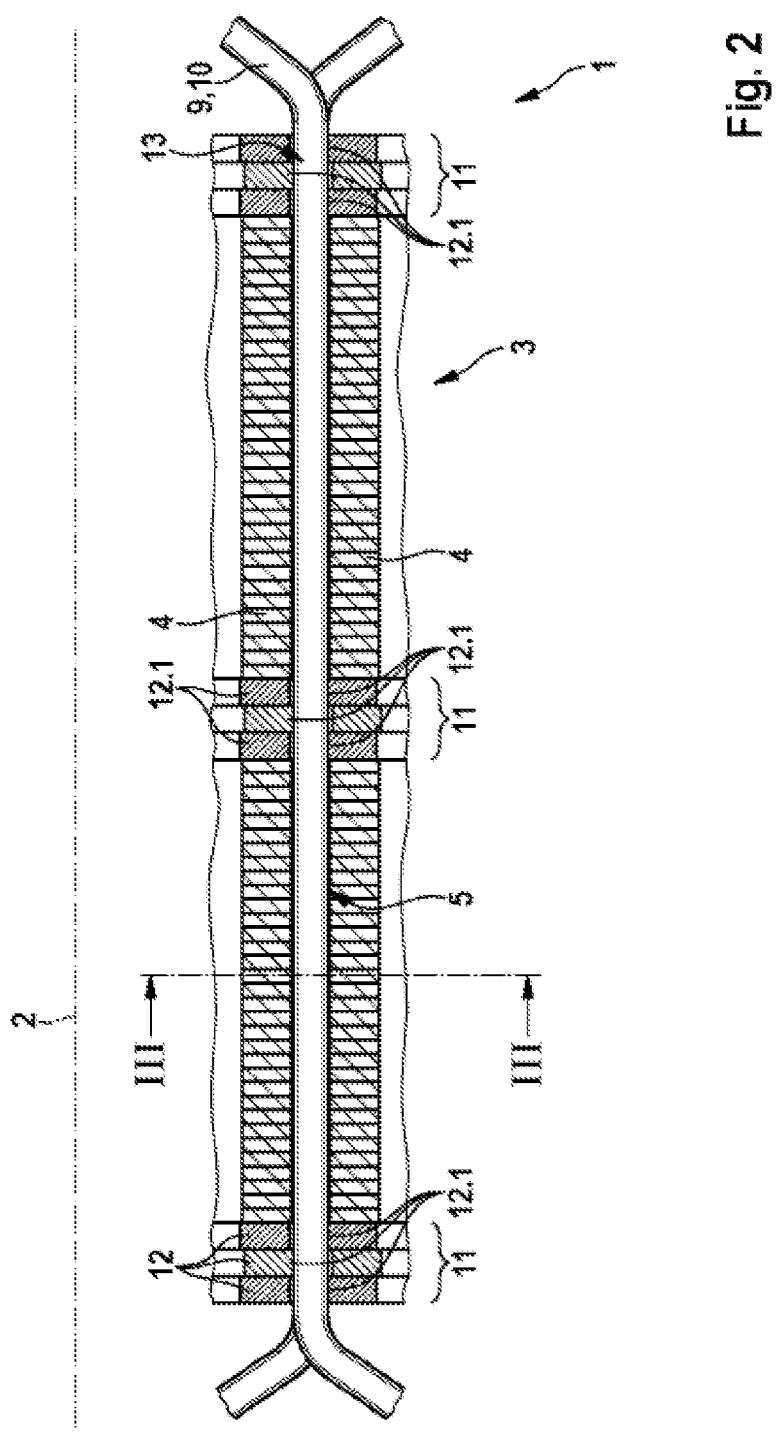

FIG. 2 shows a sectional view of the stator according to FIG. 1 with a conductor bundle mounted in one of the stator grooves at a plurality of support points according to the invention.

As shown in FIG. 2, a plurality of, e.g. three, support points 11 distanced from one another in the axial direction with respect to the stator axis 2 is formed in each of the stator grooves 5 for clamping, restraining, or supporting the conductor bundle 10 lying in the respective stator groove 5.

The support points 11 can, e.g., be formed by twisting at least two support discs 12, e.g. sheet metal laminates 6, of the laminated core 3 by a certain angle of twist Φ about the stator axis 2, or alternatively by retaining elements formed in the respective stator groove 5 (not shown). By twisting the support discs 12 in opposite directions to form the respective support point 11, support sections 12.1 of the support discs 12 are formed which project into the respective stator groove 5 from opposite sides of the stator groove 5 to retain, e.g. clamp, the conductor bundle 10 between the support sections 12.1 on retaining surfaces 13 of the conductor bundle 10. The twisted support discs 12 are fixed in the laminated core 3 to prevent further twisting, in particular by means of a bonded connection, so that stable and permanently retainable support points 11 are formed in the laminated core 3.

Between the support points 11 according to the invention, the conductor bundle 10 of the respective stator groove 5 is, e.g., freely suspended, i.e., without contact with the laminated core 3. The conductor bundle 10 of the respective stator groove 5 is thus in contact with the laminated core 6 only at the support points 11, for example.

Between the conductor bundle 10 of the respective stator groove 5 and the respective support point 11, a protective layer (not shown) can be provided, which is designed in particular in the form of a sleeve, sleeve-like, tubular, clamp-like, U-shaped, strip-like or flat strip.

Figure 3:
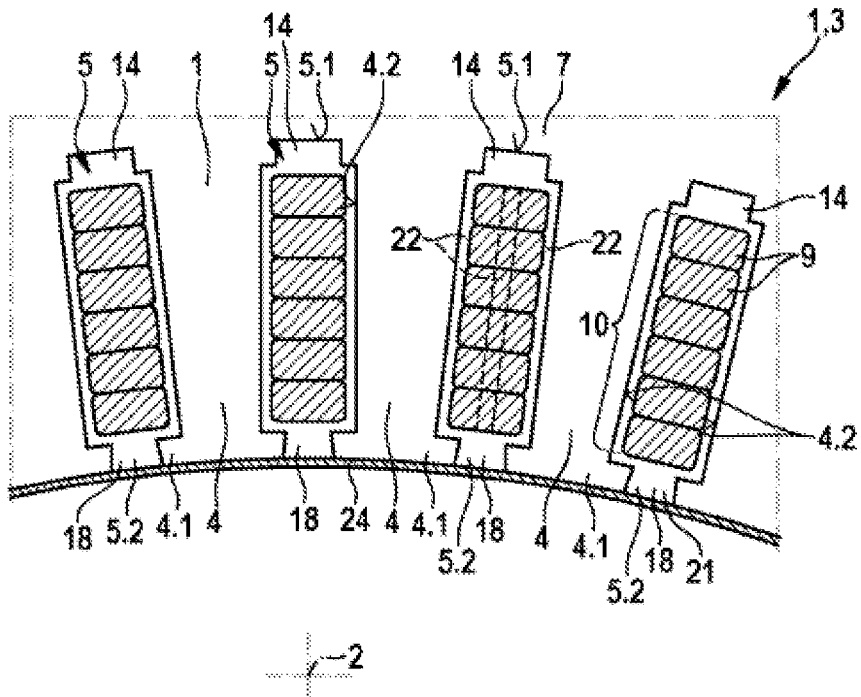

FIG. 3 shows a sectional view of the stator for a section along line III-III according to FIG. 2.

The stator grooves 5 each have a groove base 5.1 facing the stator yoke 7 and a groove slot 5.2 facing away from the groove base 5.1, which groove slot is formed in particular between two tooth heads 4.1 of the respective stator teeth 4.

Between the groove base 5.1 of the respective stator groove 5 and the conductor bundle 10 arranged in the stator groove 5 is formed a groove base channel 14 extending in the axial direction with respect to the stator axis 2, through which a coolant, in particular oil, can flow at least in sections along a cooling path 15 between a groove inlet 16 and a groove outlet 17 of the respective stator groove 5. The groove inlet 16 of the respective stator groove 5 is arranged in each case on one of the two end faces of the laminated core 3, and the groove outlet 17 of the same stator groove 5 is arranged on the other end face of the laminated core 3.

According to the invention, it is provided that in the groove slot 5.2 of the respective stator groove 5, a groove slot channel 18 extending in axial direction with respect to the stator axis 2, which is fluidically connected to the groove base channel 14 of the same stator groove 5 at at least one distributor point 21 via a distributor connection 22 running in the radial direction with respect to the stator axis 2, and in that the cooling path 15 of the stator groove 5 is designed such that a cooling flow is forced from the groove slot channel 18 via the at least one distributor connection 22 into the groove base channel 14, and/or vice versa. In this way, the conductor bundle 10 of the respective stator groove 5 is cooled more uniformly, as seen in the radial direction. The distributor connection 22 generates a radial cooling flow in each of the respective stator grooves 5 for achieving more effective or more uniform cooling of the conductor bundle 10.

Figure 4:
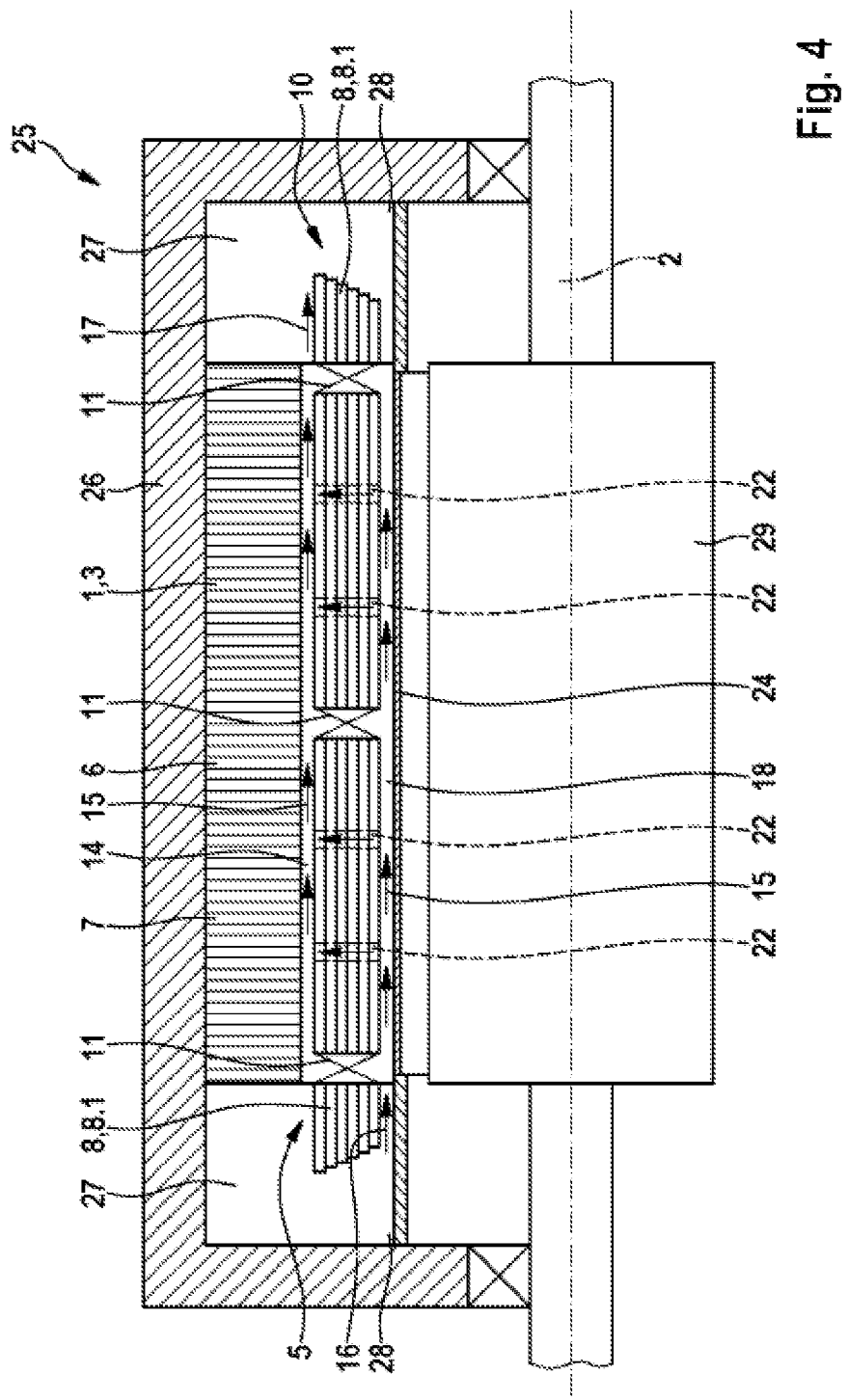

FIG. 4 shows a partial view of an electric machine in longitudinal section with the stator according to the invention in FIG. 1 to FIG. 3.

According to the exemplary embodiment, the groove inlet 16 of the respective stator groove 5 is provided at one end of the groove slot channel 18 and the groove outlet 17 of the same stator groove 5 is provided at an end of the groove base channel 14 opposite to the groove inlet 16, thereby forcing the cooling flow in the stator groove 5 through the at least one distributor connection 22. In this case, the cooling flow flows from the groove inlet 16 into the groove channel 18, from there via the at least one distributor connection 22 into the groove base channel 14, and from there finally into the groove outlet 17. The groove outlet 17 of the respective stator groove 5 is then connected to the groove inlet 16 of the same stator groove 5 only via the at least one distributor connection 22, or vice versa.

Alternatively, the groove inlet 16 of the respective stator groove 5 can also be arranged at one end of the groove base channel 14 and the groove outlet 17 of the same stator groove 5 can be arranged at an end of the groove slot channel 18 facing away from the groove inlet 16.

According to another exemplary embodiment (not shown), the groove inlet 16 and the groove outlet 17 of the same stator groove 5 can both be provided either at opposite ends of the groove slot channel 18 or at opposite ends of the groove base channel 14, a closure or throttling element being provided in the groove slot channel 18 or in the groove base channel 14 for closing or throttling a short-circuit path bypassing the distributor connection(s) 22. In this way, a meandering cooling path is created in the stator groove, which comprises at least two distributor connections 22 through which the flow passes in opposite directions, as seen in the radial direction.

In each case, the distributor connection 22 can extend through the conductor bundle 10 and/or around the conductor bundle 10. For example, the distributor connection 22 can be formed in each case by at least one channel-shaped or groove-shaped indentation on the conductor bundle 10 and/or by at least one through-channel 23 through the conductor bundle 10 or by at least one enlarged groove gap between walls of the stator groove 5 and the conductor bundle 10.

A plurality of axially distanced distributor connections 22 can be provided in the respective stator groove 5.

The groove slot channel 18 of the respective stator groove 5 is sealed radially inwards by a groove closure 24 which is, e.g., a hollow cylindrical closure sleeve that seals all stator grooves 5 or groove slot channels 18 together.

The groove base channel 14 of the respective stator groove 5 can, e.g., be formed by a groove-shaped recess in the groove base 5.1 of the stator groove 5.

The electric machine 25 has a housing 26 in which a stator 1 according to the invention is arranged. The stator winding 8 forms a winding head 8.1 at each end face of the stator 1. Within the housing 26, a winding head cooling chamber 27 accommodating the respective winding head 8.1 is provided at each end face of the stator 1 for cooling the respective winding head 8.1. In this case, flow through the stator grooves 5 of the stator 1 is possible, starting from one of the two winding head cooling chambers 27 into the other winding head cooling chamber 27, for example in parallel, in series, or with a combination of parallel and in series, in particular via the cooling paths 15 of the stator grooves 5 according to the invention.

The respective winding head cooling chamber 27 is bordered in a radially inward direction with respect to the stator axis 2 by an annular wall 28, e.g. a sealing sleeve. The annular wall 28 can, e.g., extend into an air gap formed between the stator 1 and a rotor 29 of the electric machine 25 to form what is referred as a gap tube, and/or groove closure 24, and project through the gap in the axial direction with respect to the stator axis 2.

The invention claimed is:

1. A stator (1) of an electric machine (25), said stator having a stator axis (2) and a laminated core (3) on which stator teeth (4) are formed, with stator grooves (5) lying between the stator teeth (4), said stator comprising a plurality of sheet metal laminates (6), wherein the stator teeth (4) are connected together via an annular stator yoke (7), wherein a conductor bundle (10) comprising a plurality of conductors (9) is arranged in each of the stator grooves (5) in order to form an electric stator winding (8), wherein each of the stator grooves (5) has a groove base (5.1) facing the stator yoke (7) and a groove slot (5.2) facing away from the groove base (5.1), wherein a plurality of support points (11) distanced from one another in an axial direction with respect to the stator axis (2) are formed in each of the stator grooves (5) in order to support the conductor bundle (10) lying in the respective stator groove (5), wherein a groove base channel (14) which extends in the axial direction and through which a coolant can flow along at least some sections of a cooling path (15) between a groove inlet (16) and a groove outlet (17) of the respective stator groove (5) is formed between the groove base (5.1) of the respective stator groove and the conductor bundle (10) arranged in the stator groove (5), wherein a groove slot channel (18) extending in the axial direction is formed in the groove slot (5.2) of the respective stator groove (5), said groove slot channel being fluidically connected to the groove base channel (14) of the same stator groove (5) at at least one distributor point (21) via a distributor connection (22) running in a radial direction with respect to the stator axis (2), and the cooling path (15) of the stator groove (5) is formed such that a cooling flow is forced from the groove slot channel (18) into the groove base channel (14) and/or vice versa via the distributor connection (22).

2. The stator according to claim 1, wherein the groove inlet (16) of the respective stator groove (5) is provided at one end of the groove slot channel (18), and the groove outlet (17) of the same stator groove (5) is provided at an end of the groove base channel (14) remote from the groove inlet (16), or wherein the groove inlet (16) of the respective stator groove (5) is arranged at one end of the groove base channel (14), and the groove outlet (17) of the same stator groove (5) is arranged at an end of the groove slot channel (18) facing away from the groove inlet (16).

3. The stator according to claim 1, wherein the groove inlet (16) and the groove outlet (17) of the same stator groove (5) are both provided either at opposite ends of the groove slot channel (18) or at opposite ends of the groove base channel (14), wherein, in the groove slot channel (18) or in the groove base channel (17), a closure or throttling element is provided for closing or throttling a short-circuit path bypassing the distributor connection (22).

4. The stator according to claim 1, wherein the respective distributor connection (22) passes through the conductor bundle (10) and/or around the conductor bundle (10).

5. The stator according to claim 4, wherein the distributor connection (22) is formed in each case by at least one channel-shaped or groove-shaped indentation on the conductor bundle, or by at least one through-channel (23) through the conductor bundle (10), or by at least one enlarged groove gap between walls of the stator groove (5) and the conductor bundle (10).

6. The stator according to claim 1, wherein a plurality of axially distanced distributor connections (22) is provided in the respective stator groove (5).

7. The stator according to claim 1, wherein the groove slot channel (18) of the respective stator groove (5) is sealed radially inwards with a groove closure (24).

8. The stator according to claim 1, wherein the groove base channel (14) of the respective stator groove (5) is formed by a groove-shaped recess in the groove base of the stator groove (5).

9. The stator according to claim 1, wherein the support points (11) are formed by twisting at least two support discs (12) of the laminated core (3) by a selected angle of twist (@) about the stator axis (2), or by retaining elements formed in the respective stator groove (5).

10. An electric machine (25) having a housing (26) in which the stator (1) according to claim 1 is arranged, wherein the stator winding (8) forms a winding head (8.1) on each end face of the stator (1), wherein a winding head cooling chamber (27) which accommodates the respective winding head (8.1) is provided inside the housing (26) on each end face of the stator (1) for cooling the respective winding head (8.1), wherein flow is possible through the stator grooves (5), starting from one of the two winding head cooling chambers (27), via the cooling path (15) of the stator grooves (5), and into the other one of the two winding head cooling chambers 27.

11. The stator according to claim 1, wherein the conductor bundle (10) includes a stack of flat wire conductors.

12. The stator according to claim 1, wherein the coolant is oil.

13. The stator according to claim 1, wherein the groove slot (5.2) is formed between two tooth heads (4.1) of the respective stator teeth (4).

14. The stator according to claim 9, wherein the at least two support discs (12) are sheet metal laminates (6) of the laminated core (3).

15. The stator according to claim 1, wherein an air gap is formed between the stator (1) and a rotor (29) of the electric machine (25), wherein the groove slot channel (18) is fluidically sealed from the air gap.

16. The stator according to claim 1, wherein the groove slot channel is fluidically connected to the groove base channel (14) of the same stator groove (5) at at least one distributor point (21) via a distributor connection (22) running in a purely radial direction with respect to the stator axis (2).

* * * * *